May 21, 1946.　　A. G. SHEPHERD　　2,400,658
SWING JOINT
Filed Sept. 17, 1943
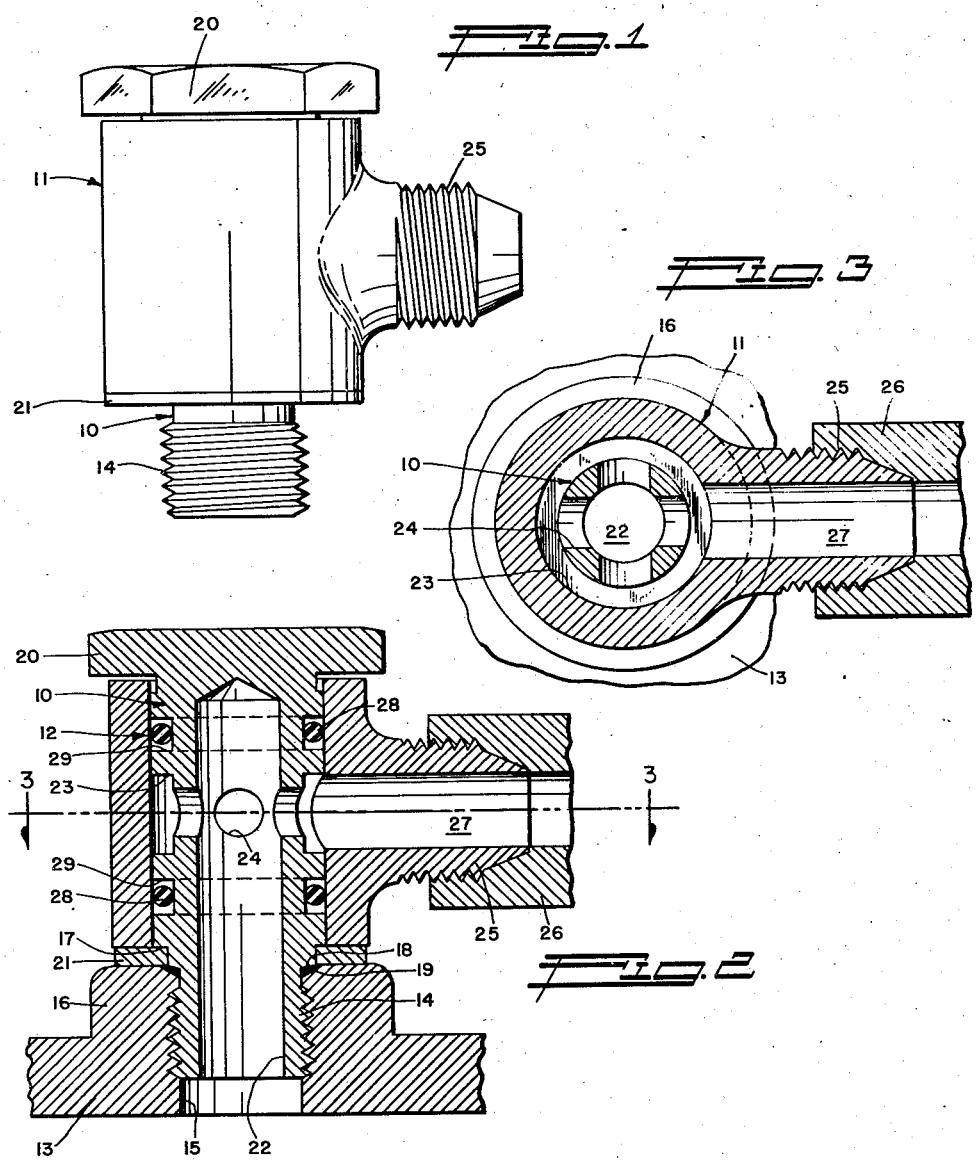
Inventor
Allan G. Shepherd
By　　*George C. Sullivan*
　　　　Agent Patented May 21, 1946

2,400,658

UNITED STATES PATENT OFFICE 2,400,658

SWING JOINT

Allan G. Shepherd, Burbank, Calif., assignor, by mesne assignments, to Lockheed Aircraft Corporation, a corporation of California Application September 17, 1943, Serial No. 502,791

6 Claims. (Cl. 285—96.3)

This invention relates to fluid conducting joints, and relates more particularly to swivel joints or swing joints for embodiment in systems and mechanisms handling fluid under pressure. A general object of the invention is to provide a simple, practical and highly effective fluid conducting swing joint.

In many fluid pressure systems it is necessary or desirable to employ swivel joints or swing joints. For example, this type of joint is extensively employed in fluid systems in combination with rigid tubing instead of the flexible hoses heretofore employed in such situations. So far as I am aware, none of the swing joints that have been introduced are hydraulically balanced. As a result of the unbalanced fluid pressure conditions in the prior joints, there is considerable frictional resistance to relative rotation between the joint parts, and in some types of joints the sealing material is subjected to unbalanced and excessive pressures. These conditions are aggravated, and the resistance to relative rotation between the parts is materially increased, in installations where the fluid is handled under high pressures. In many of the prior swing joints the sealing material is actuated or compressed by screw threaded parts, springs, or the like, and offers substantial resistance to relative rotation of the parts even under low fluid pressure conditions. Further the conventional swing joints are usually quite expensive and often embody antifriction bearings for assuming the loads which result from the unbalanced pressure conditions.

A principal object of this invention is to provide a swing joint for handling fluid under pressure in which the relatively rotatable elements are hydraulically balanced to allow free relative rotation under all fluid pressure conditions. The torque required to swing or rotate the movable joint element is exceedingly small and does not change appreciably with increase or decrease in the fluid pressure.

Another object of the invention is to provide a swing joint that does not embody or require screw thread means, or the like, for conditioning or compressing the sealing means. In the joint of the present invention, the sealing rings are merely engaged in grooves in one or both of the relatively turnable joint parts under suitable initial diametrical compression to seal between said parts and no compressing or actuating means are required. The sealing rings are never excessively compressed to offer inordinate resistance to relative rotation between the parts.

A further object of the invention is to provide a swing joint that embodies a minimum number of simple, inexpensive parts. The improved joint of the invention requires only two principal elements which may be simple, one-piece parts and the only other elements employed are sealing rings and a washer.

Other objects and features of this invention will become apparent from the following detailed description of a typical preferred form of the invention throughout which description reference may be had to the accompanying drawing in which:

Figure 1 is a side elevation of the joint of the invention;

Figure 2 is a central longitudinal detailed sectional view of a joint of the invention; and Figure 3 is a transverse detailed sectional view taken as indicated by line 3—3 on Figure 2.

The present invention may be embodied in joints varying considerably and having different applications. In the drawing I have illustrated one simple form of the invention constructed to handle a single stream of fluid under pressure. It is to be understood that the invention may be embodied in forms suitable for other uses and the invention is not to be taken as limited to the purely illustrative embodiment herein described.

The swing joint of the present invention may be said to comprise generally a body 10, a sleeve member 11, the body and member being related for relative rotation, and means 12 for sealing between the body and member.

The body 10 forms the inner part and principal element of the joint assembly. In the simple form of the invention illustrated, the body 10 is a one-piece element resembling a stud or bolt. The body 10 is formed or provided at its inner end with means for facilitating its connection with a part 13 of the fluid handling system or apparatus. I have shown the body 10 provided with an externally screw threaded stem 14, threadedly engaged in a fluid opening 15 in the part 13. The part 13 has a boss 16 through which the opening 15 extends and the stem 14 is screwed into the boss. The stem 14 is of reduced external diameter providing the body 10 with an annular shoulder 17 which opposes the end face of the boss 16. The exterior of the body 10 is stepped or graduated between the shoulder 17 and the stem 14 to have a second annular shoulder 18. The second shoulder 18 may be relatively narrow and sloped downwardly and inwardly. A suitable sealing ring 19 is arranged around the stem 14 and is compressed between the shoulder 18 and the end of the boss 16 to prevent the leakage of fluid under pressure from around the stem.

The body 10 is an elongate generally cylindrical element and has a cylindrical external surface extending outwardly from the shoulder 17. The outer end of the body 10 is provided with a radially projecting flange or head 20. The inner or under side of the head 20 forms a face which is preferably flat and normal to the longitudinal axis of the body 10. The head 20 may be polygonal in external configuration for engagement by a wrench, or the like, to facilitate the screwing of the stem 14 into the opening 15.

In accordance with the invention, the body 10 is rigidly secured to the part 13 by threading the stem 14 into the opening 15. The threading of the stem into the opening is definitely stopped or limited so that the inner face of the head 20 bears a given spaced relation to the face of the boss 16. A washer 21 is arranged around the stem 14 to be clamped between the body shoulder 17 and the end face of the boss 16. When the stem 14 is threaded into the opening 15 the washer 21 becomes tightly clamped between the shoulder 17 and the face of the boss 16. The washer 21 is larger in external diameter than the body 10 and presents a face which opposes the inner face of the head 20 and which bears a given spaced relation to the face of the head. It is to be understood that the washer 21 may be dispensed with if desired so that the body shoulder 17 directly cooperates with the boss 16, in which case the boss 16 presents an end face having a given spaced relation to the inner face of the head 20. It is important to note that the shoulder 17 or washer 21, as the case may be, constitutes a stop for limiting the inward screwing of the stem 14 to assure the definite spaced relationship just described.

The body 10 is provided with one or more fluid passages. In the simple form of the invention illustrated, there is a single fluid passage 22 entering the end of the stem 14 and extending some distance longitudinally into the body 10. The outer end of the fluid passage 20 is closed by the integral end wall or head of the body. An annular external groove 23 is provided in the body 10 and a plurality of spaced radial ports 24 extends from the passage 22 to the groove 23. The groove 23 is substantially midway between the inner face of the head 20 and the shoulder 17.

The member 11 constitutes the outer element of the joint assembly. The member 11 is in the nature of a tube or sleeve surrounding the body 19 between the head 20 and the boss 16. The central longitudinal opening of the member 11 is proportioned to receive the body 10 so that there may be free relative rotation between the body and member. The opposite ends of the member 11 are preferably, though not necessarily, flat and normal to the longitudinal axis of the joint. The member 11 is proportioned to be readily received between the inner face of the head 20 and the washer 21. In practice, the length of the member 10 may be slightly less than the distance between the face of the head 20 and the washer 21 so that the member remains free and cannot be bound when the stem 14 is screwed home in the opening 15.

The member 11 is formed to facilitate its connection in the fluid handling system. A lateral or radial boss 25 projects from the member 11 substantially midway between its ends. I have shown the boss 25 externally screw threaded to readily receive a coupling or connection 26 of the fluid system. A fluid opening or passage 27 extends through the boss 25 and wall of the member 11 to communicate with the groove 23. It is believed that it will be understood how the ports 24 and groove 25 maintain the passage 22 and the passage 27 in full communication at all times.

The means 12 serves to seal between the body 10 and the interior of the member 11 at opposite sides of the annular groove 23 to prevent the leakage of fluid from between the body and member. The means 12 is characterized by the fact that it offers little resistance to relative rotation between the body 10 and member, and by the fact that variations in the pressure on the fluid being handled do not appreciably vary the resistance to the relative rotation. The sealing means 12 includes sealing rings 28 carried either by the body 10 or the member 11. In the particular construction illustrated, the sealing rings 28 are provided on the body 10 to seal with the internal surface of the member 11. An annular external groove 29 is provided in the body 10 at each side of the groove 23 and contains a sealing ring 28. The grooves 29 are preferably equally spaced from the groove 23. In the particular structure illustrated, the end walls of the grooves 29 are flat and normal to the longitudinal axis of the joint, it being understood that in some cases it may be desired to chamfer or round off the corners occurring where the walls of the grooves join the external surface of the body. The sealing rings 28 are formed of flexible resilient sealing material such as rubber, synthetic rubber, or the like. The rings 28 are round or cylindrical in transverse cross section and are proportioned so that they are slightly compressed between the inner walls of the grooves 29 and the interior surface of the member 11. This form of sealing ring has proven to be highly effective under high pressure conditions, varying temperature conditions and extensive usage. A substantial increase in the pressure on the fluid being handled will not cause the sealing rings 28 to offer any appreciable increase in resistance to relative rotation between the body 10 and the member 11. It is to be observed that the compression force which maintains the sealing rings 28 active, does not tend to urge the sleeve member 11 axially in either direction. In fact, the fluid pressures acting on the member 11 and the sealing rings 28 are balanced, and the member 11 is not urged against the head 20 or the washer 21 and there is no necessity for incorporating thrust bearing means in the joint.

It is believed that the utility and practicability of the joint provided by the invention will be readily apparent from the foregoing detailed description. With the joint connected to the part 13 and coupling 26 as illustrated, fluid under pressure may be conducted through the joint in either direction. The member 11 is free to turn or rotate with respect to the body 10 when the joint carries fluid under pressure. In this connection, it is to be observed that the hydraulic pressures on the joint are balanced so that they do not resist relative rotation between the joint parts. Assuming that the part 13 is relatively stationary and that the member 11 is turned with respect to the body 10, it will be seen that the fluid pressure does not resist such turning and does not urge any of the parts into frictional engagement to resist such turning. The axially directed fluid pressures are assumed entirely by the body 10 fixed to the stationary part 13, with the exception of the axial pressures acting on the sealing rings 28. The pressures acting on the sealing rings 28 are oppositely directed and therefore balanced out. Where the fluid is under exceedingly high pressure, the sealing rings 28 may be distorted to a minor degree so that the friction resisting rotation of the member 11 is increased. In practice, however, the distortion of the rings 28 is very slight and the increase in the friction is minor, being much less than developed by other types of sealing means under similar circumstances. The groove 23 is annular and the zone between the rings 28 is annular and substantially unbroken so that the radially directed fluid pressures acting on the member 11 are substantially balanced. The joint is inexpensive to manufacture and is easily installed and serviced.

Having described only a typical form of the invention, I do not wish to be limited to the specific details herein set forth, but wish to reserve to myself any variations or modifications that may appear to those skilled in the art or fall within the scope of the following claims.

I claim:

1. A swing joint for use with a part having a fluid opening and a face, the joint comprising a body formed for screw threaded atachment to said part and having a shoulder extending inwardly from the external surface of said body for cooperating with said face to definitely limit the screwing for the body to said part, the body having a second shoulder extending outwardly from the external surface of said body and spaced from and opposing said face, a member installable over the first named shoulder surrounding the body between said face and second shoulder and related to the body for relative rotation, the cooperation of the first named shoulder and said face preventing the member from being clamped between said face and second shoulder, and means for sealing between the body and member, there being a fluid passage extending through the body and member and communicating with said fluid opening.

2. A swing joint for use with a part having a fluid opening and a face, the joint comprising a body, a stem on the body adapted to be threaded into said opening to secure the body to said part, a shoulder on the body extending inwardly from the external surface of said body for engaging said face to limit the threading of the stem in said opening, a second shoulder on the body extending outwardly from the external surface of said body and opposing said face and bearing a definite spaced relation to said face by reason of the engagement of the first named shoulder with said face, a member freely rotatable on the body between said second shoulder and said face and installable over the first named shoulder, the body and member having a fluid passage communicating with said opening, and means for sealing between the body and member for preventing the leakage of fluid therebetween.

3. A swing joint for use with a part having a fluid opening and a face, the joint comprising a body having a head extending outwardly from the external surface of the body at one end and a reduced stem at the other end adapted to be secured in said opening, there being a shoulder on the body extending inwardly from the external surface of the body at the root of the stem for engaging said face to definitely space the head with respect to said face, a sleeve member installable over said shoulder and supported on the body between said face and head for free relative rotation, the sleeve having a lateral fluid opening, the body having a fluid passage extending between and connecting said openings, and means for sealing between the body and member to prevent the leakage of fluid from therebetween.

4. A swing joint for use with a part having a fluid opening and a face, the joint comprising a body formed for screw threaded attachment to said part and having a shoulder extending inwardly from the external surface of the body for cooperating with said face to definitely limit the screwing of the body to said part, the body having a second shoulder extending outwardly from the external surface of the body and spaced from and opposing said face, a member installable over the first named shoulder surrounding the body between said face and second shoulder and related to the body for relative rotation, the cooperation of the first named shoulder and said face preventing the member from being clamped between said face and second shoulder, the member having a lateral fluid opening, the body having a fluid passage extending between and connecting said openings, and means for sealing between the body and member at opposite sides of the point of communication of the passage with the second named opening.

5. A swing joint for use with a part having a fluid opening and a face, the joint comprising two elements related for free relative rotation, one a body having two longitudinally spaced correspondingly facing shoulders, the other a sleeve rotatably supported on the body, a stem on the body adapted to be secured in said opening, one of said shoulders extending inwardly from the external surface of the body and the other shoulder extending outwardly from the external surface of the body, the first named shoulder serving to engage said face to definitely space the other shoulder from said face, the sleeve, installable over the first named shoulder, being arranged on the body between said face and said other shoulder and having a lateral fluid opening, the body having a fluid passage extending between and connecting said openings, one of the elements having a groove spaced from each side of said lateral opening, and sealing rings in said grooves for sealing between the body and sleeve to prevent the leakage of fluid from therebetween.

6. A swing joint for use with a part having a fluid opening and a face, the joint comprising two elements related for free relative rotation, one a body having two longitudinally spaced correspondingly facing shoulders, the other a sleeve rotatably supported on the body, a stem on the body adapted to be secured in said opening, one of said shoulders extending inwardly from the external surface of the body and the other shoulder extending outwardly from the external surface of the body, the first named shoulder serving to engage said face to definitely space the other shoulder from said face, the sleeve, installable over the first named shoulder, being arranged on the body between said face and said other shoulder and having a lateral fluid opening, the body having a fluid passage extending between and connecting said openings, one of the elements having a groove spaced from each side of said lateral opening, and sealing rings of cylindrical transverse cross section in said grooves for sealing between the body and sleeve to prevent the leakage of fluid from therebetween.

ALLAN G. SHEPHERD.